United States Patent [19]

Paul

[11] Patent Number: 5,411,014

[45] Date of Patent: May 2, 1995

[54] RAPID HEATING COOKWARE

[75] Inventor: Gerald T. Paul, Whitelaw, Wis.

[73] Assignee: Anchor Hocking Corporation, Freeport, Ill.

[21] Appl. No.: 175,820

[22] Filed: Dec. 30, 1993

[51] Int. Cl.$^6$ ............................................. H47J 27/00
[52] U.S. Cl. .................................. 126/390; 220/608; 220/912
[58] Field of Search ................. 220/912, 608; 126/390

[56] References Cited

U.S. PATENT DOCUMENTS

| | | |
|---|---|---|
| D. 269,243 | 6/1983 | Lam . |
| 2,217,555 | 10/1940 | Klusmeyer ........................ 126/390 |
| 4,078,479 | 3/1978 | Mori . |
| 4,508,100 | 4/1985 | Deville . |
| 4,768,427 | 9/1988 | Cheng ............................. 126/390 |
| 4,926,843 | 5/1990 | Vocke et al. ..................... 126/390 |

FOREIGN PATENT DOCUMENTS 911813 7/1946 France ................................ 126/390

*Primary Examiner*—Carroll B. Dority
*Attorney, Agent, or Firm*—Baker & McKenzie; James G. Staples

[57] ABSTRACT

This invention pertains to cookware and more particularly to a cookware vessel in which the cooking surface reaches the desired cooking temperature in the shortest possible time, which has an increased bottom area available to absorb heat from a heating source, which maintains its rigidity over a longer period of time as contrasted to conventional constructions and, as a consequence, distributes heat more evenly throughout the bottom area, and which is more stable with respect to the heat source during use.

9 Claims, 5 Drawing Sheets

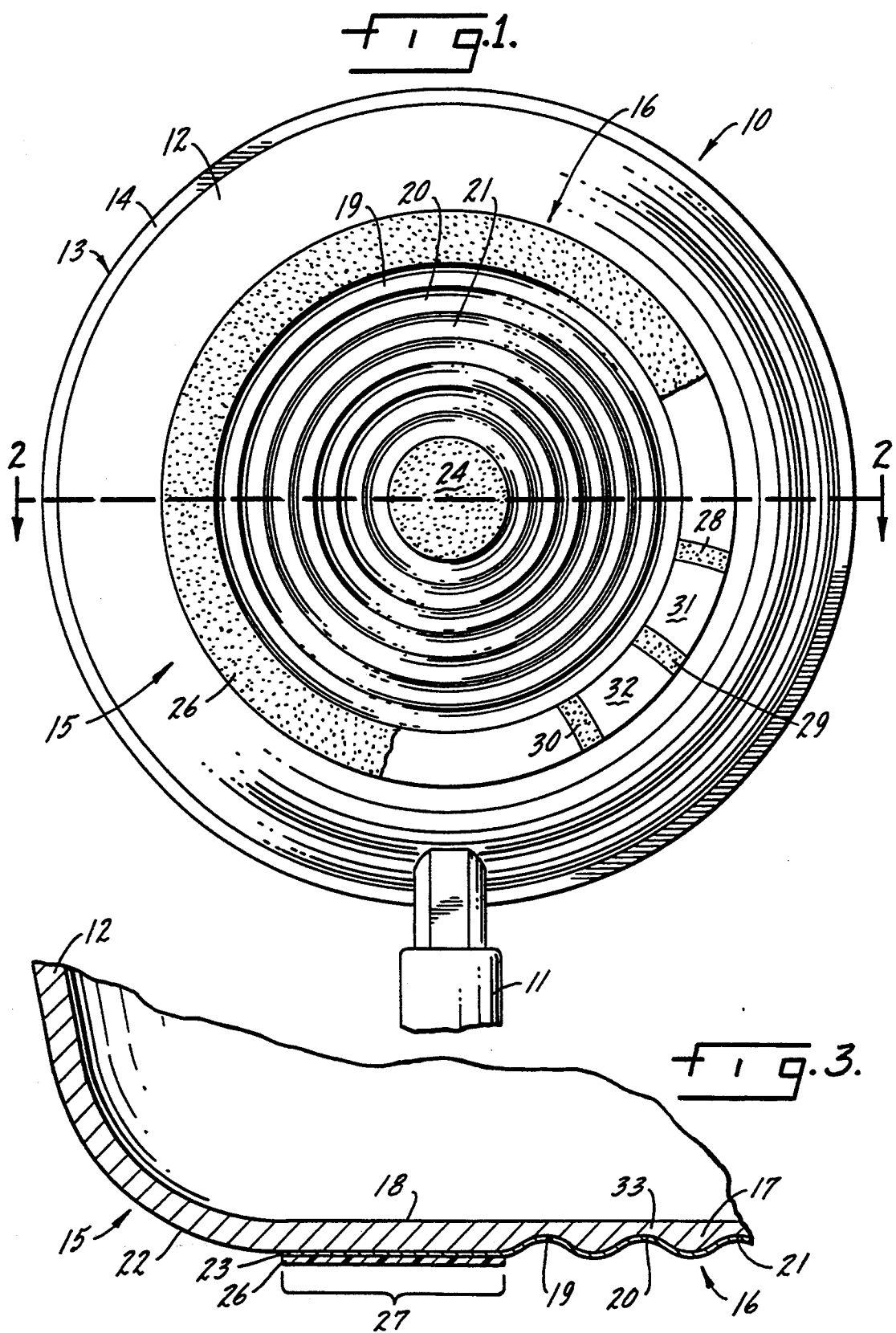

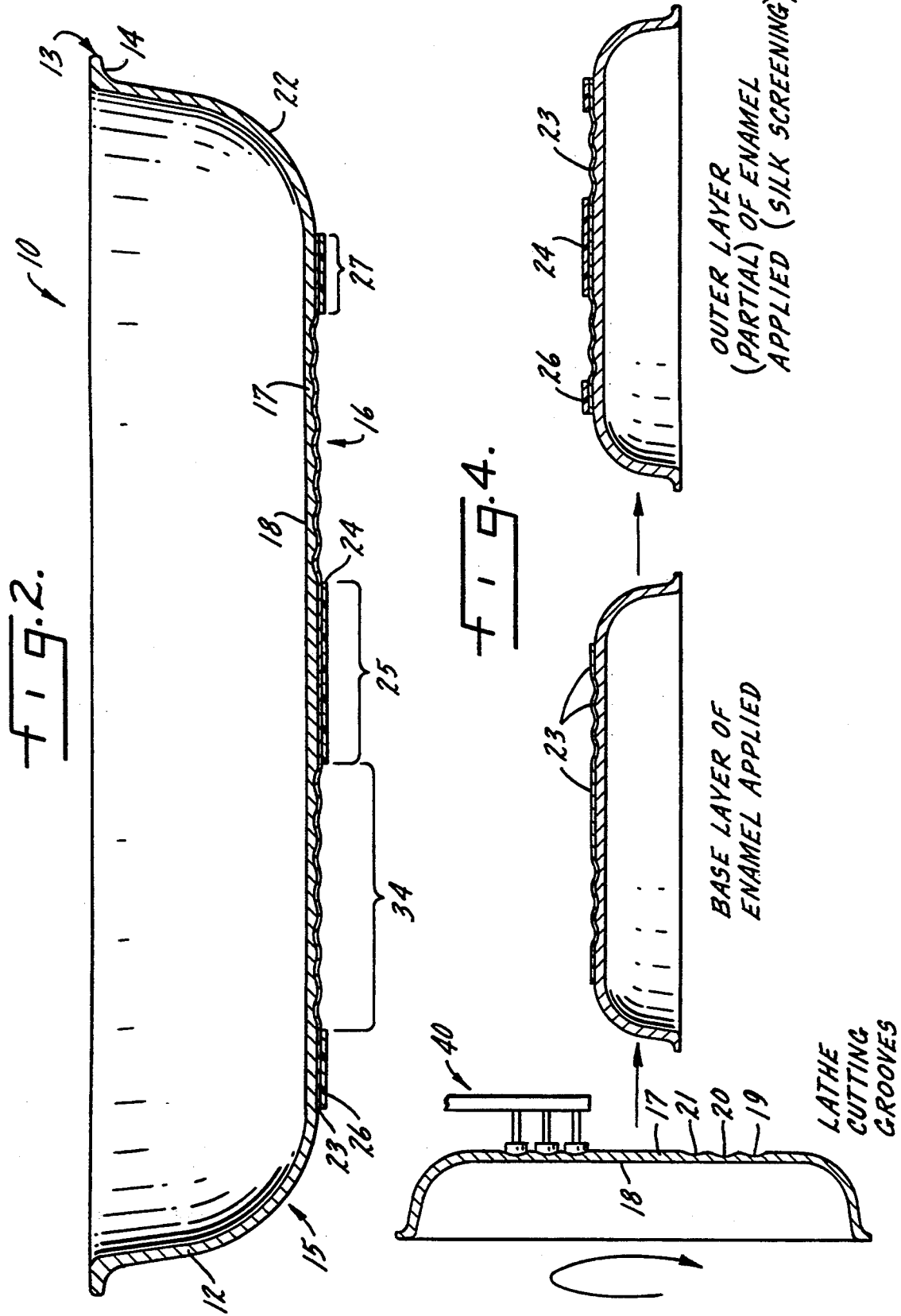

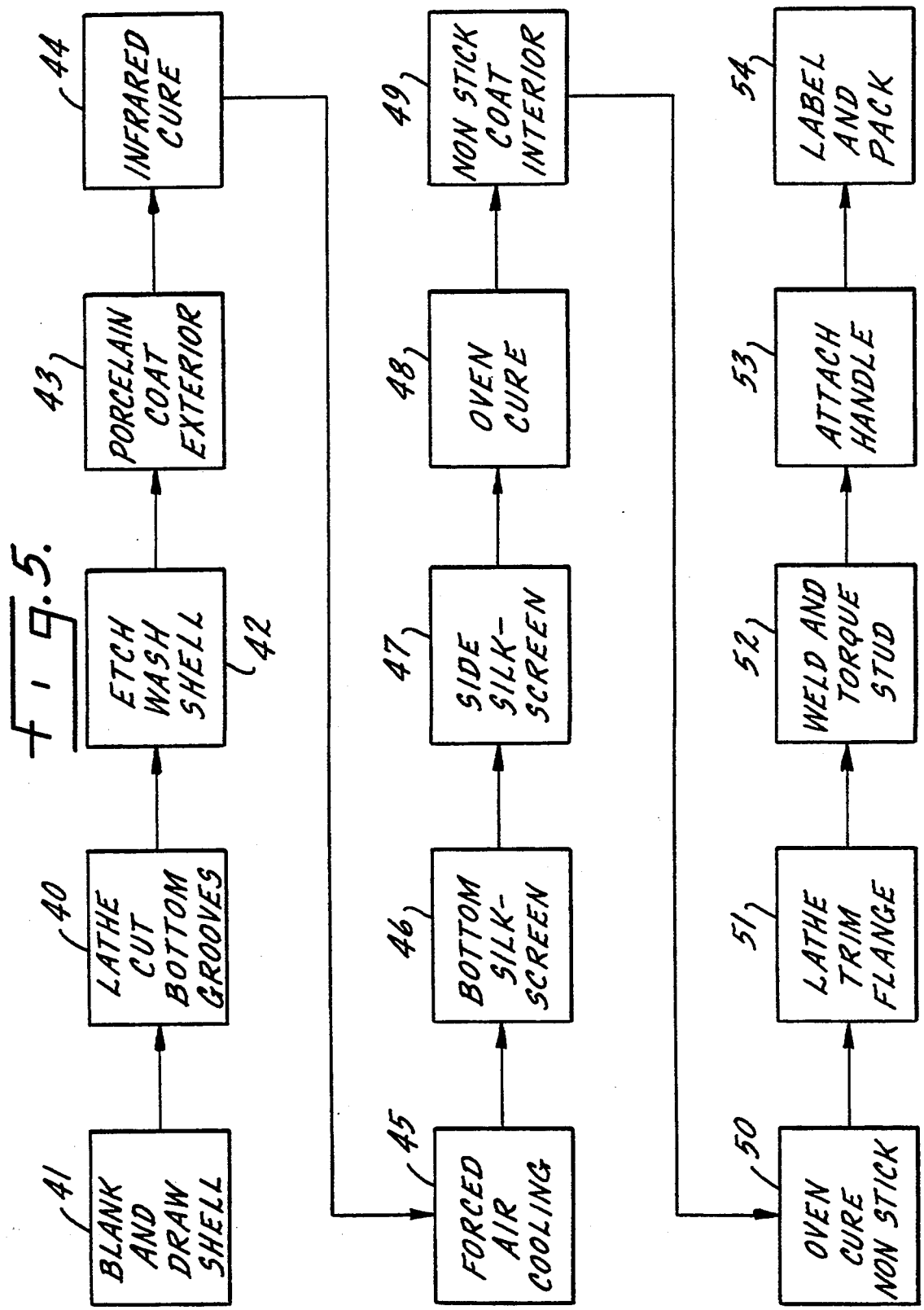

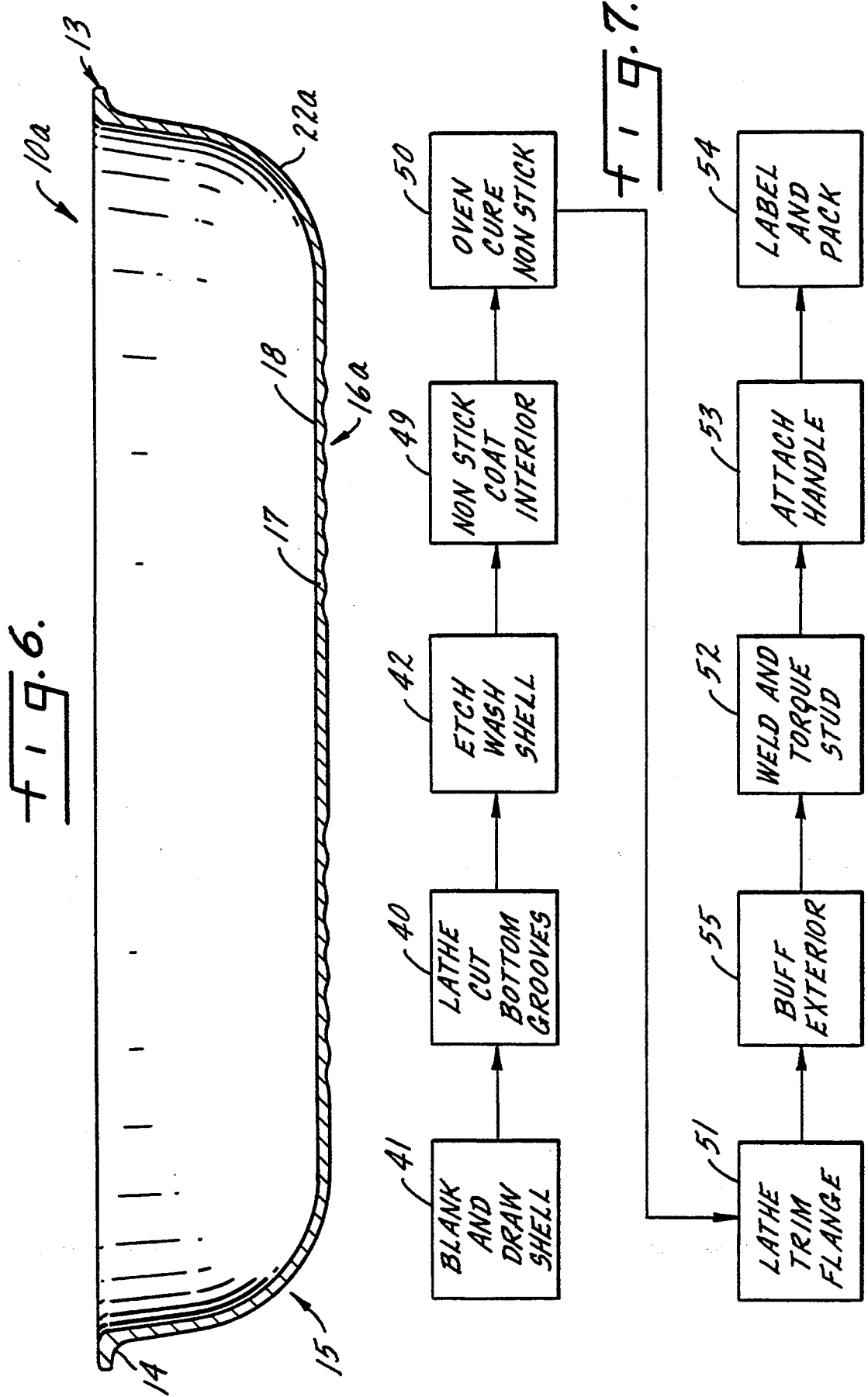

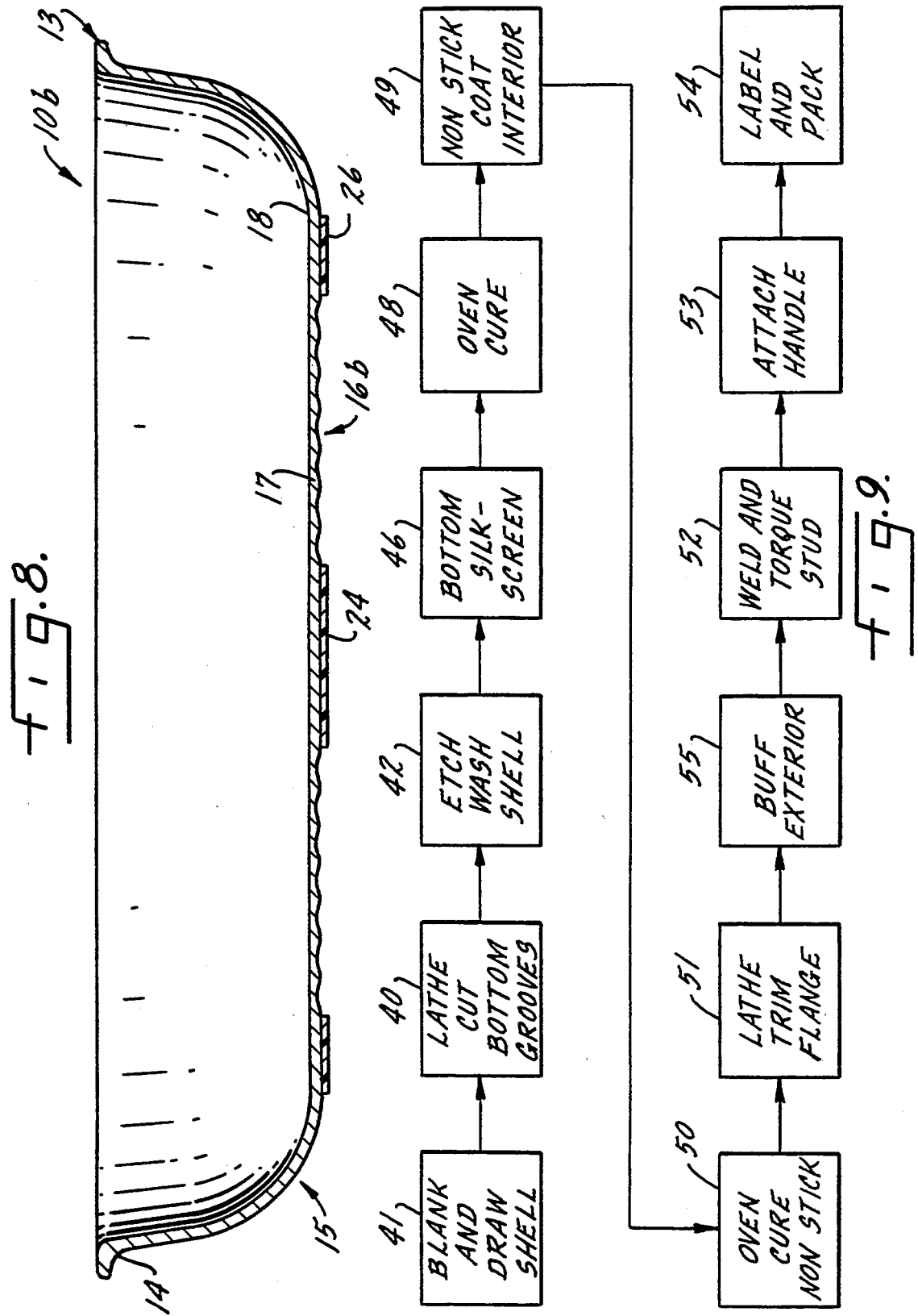

RAPID HEATING COOKWARE

FIELD OF INVENTION

This invention pertains generally to cookware and more particularly to a cookware vessel in which the cooking surface reaches the desired cooking temperature in the shortest possible time, which has an increased bottom area available to absorb heat from a heating source, which maintains its rigidity over a longer period of time as contrasted to conventional constructions and, as a consequence, distributes heat more evenly throughout the bottom area, and which is more stable with respect to the heat source during use.

BACKGROUND OF THE INVENTION

The great majority of cooking vessels generally have circular or oval configurations which include a bottom and an upwardly extending side wall, though some vessels may have little or no side wall. However, conventional cookware vessels invariably have a flat bottom of uniform thickness. Two undesirable performance characteristics of such a typical construction are that (1) a maximum amount of time is required to bring the cooking surface to the desired cooking temperature and (2) the vessel slides easily when in contact with a support structure during cooking. The slowness of the cooking surface to reach cooking temperature is particularly disadvantageous since present day consumers spend less and less time cooking foods and hence demand that cooking times be as short as possible. The capacity of conventional vessels to absorb heat is limited by the area defined by the heat source, usually circular, such as the area of an electric burner or the heating envelope of a gas burner. Conventional vessels also have a tendency to warp, particularly in the larger sizes, over time due to such factors as being accidentally permitted to "cook dry"; that is, to be kept on a stove in contact with the heat source after the contents have been removed, or boiled dry.

As a consequence there is a need for a cookware vessel which heats to cooking temperature quickly, which has an increased capacity to absorb heat from a heat source so as to minimize fuel usage and reduce cooking time, which cannot be slid easily off a burner or other heat source thereby spilling the contents, and which retains a nominally flat contour over time, even in the larger sizes and when subject to substantial distorting forces during use.

SUMMARY OF THE INVENTION

The invention is a cookware vessel having a unique multilayer bottom construction which reaches cooking temperature in the shortest possible time, increases the quantity of heat applied to the bottom of the vessel as contrasted to a similar nominally sized conventional bottom, distributes the heat more uniformly in the heat application area, maintains its original rigidity for a longer period of time as contrasted to conventional vessels, and has a higher coefficient of friction than conventional vessels whereby the tendency of the vessel to slide off the heat source due to the normal bumping forces to which it is subjected in use, with subsequent spillage of the contents, is substantially reduced.

The vessel bottom has a series of concentric circular grooves formed therein which encircle a flat central area. The grooves are formed so that hot products of combustion can circulate within the grooves thereby quickly and uniformly distributing heat throughout the entire heat receiving area of the bottom. Since a greater bottom surface area is exposed to the heat source due to the greater surface area of the grooves, a greater surface area than that presented simply by a flat area with the same peripheral contour is provided and thus more heat is absorbed by the heat receiving area.

The essence of the invention, however, is that the grooves, both the peaks and the valleys, have only the minimum required coating thereon so that a minimum impediment to the quick transmission of heat from the bottom surface to the cooking surface is provided. Since the grooves are concentric circles there will always be a plurality of groove edges which will be perpendicularly, or partially perpendicularly, presented to the supporting structure, such as a gas burner or an electric coil, whereby displacement of the vessel against the restraining forces provided by the supporting structure is impeded.

Three preferred embodiments are illustrated and described. All three embodiments include the grooves described above. The first preferred embodiment includes an outer coating of porcelain on the grooves with supplemental friction means applied to the inner flat central area and outer periphery of the pan. A second preferred embodiment includes a pan with an outer polished surface with no porcelain enamel or supplemental friction material coating applied thereto. A third preferred embodiment includes supplemental frictional material applied to the central area and outer peripheral area with the remaining portion of the outer surface of the pan, including the grooves, having a polished exterior with no additional coating applied thereto.

The present invention also lends itself to an improved method of fabricating cookware. The shell is pressed and the bottom grooves discussed above are cut into the bottom of the shell. The shell is then washed with an acid or caustic solution to roughen up the surface for the better adherence of coatings. If a porcelain exterior is to be applied to the outer surface of the pan, the coating is applied and cured followed by a forced air cooling process. If supplemental frictional material is to be applied to the central and peripheral areas at the bottom surface of the pan, the supplemental frictional material is applied via a silk screen process followed by an oven curing. Side decorations may be applied via silk screening prior to the oven curing step. Then, a non-stick coating is applied to the interior surface of the pan which is then oven cured. The flange is then trimmed with a lathe or cutting tool. If the outer surface of the pan includes an exposed metal surface without a porcelain coating, the exterior is then buffed. Then the stud is welded and torqued onto the sidewall of the pan, the handle is attached and then the cookware is labeled and packed for shipment.

BRIEF DESCRIPTION OF THE DRAWINGS

The invention is illustrated more or less diagrammatically in the accompanying drawings in which FIG. 1 is a bottom plan view of a cookware vessel of this invention with parts broken away for clarity;

FIG. 2 is a sectional view to an enlarged scale taken substantially along the line 2—2 of FIG. 1;

FIG. 3 is a partial section view to an enlarged scale as contrasted to FIG. 2 of the lower edge of the cookware vessel of this invention;

FIG. 4 is a diagrammatic view of the coating steps in the process for manufacturing the cookware vessel of this invention;

FIG. 5 is a schematic representation of the steps in the manufacturing process for the cookware vessel illustrated in FIG. 1;

FIG. 6 is a sectional view to an enlarged scale illustrating a cookware vessel made in accordance with the present invention and having a polished metal exterior;

FIG. 7 is a schematic representation of the steps in the manufacturing process for the cookware vessel illustrated in FIG. 6;

FIG. 8 is a sectional view to an enlarged scale illustrating the cookware vessel made in accordance with the present invention and having Supplemental friction means applied to the undersurface of the vessel, the remaining exterior surface of the vessel being polished metal; and FIG. 9 is a schematic representation of the steps for manufacturing the cookware vessel illustrated in FIG. 8.

DETAILED DESCRIPTION OF THE INVENTION

In the following description of the invention, like reference numerals will be used to refer to like parts from Figure to Figure in the drawing.

A representative example of the cookware of this invention is indicated generally at 10 in FIGS. 1 and 2. In this instance a frying pan 10 of, for example, about 2½ inches depth and about 8 inches in diameter has been shown, the pan having a handle 11, extending outwardly from the vessel for grasping and carrying. Since the handle does not form a part of the invention it is not further illustrated or described. The sidewall of the vessel is indicated at 12, the upper end of the circular sidewall terminating in an outwardly flared lip, indicated generally at 13, the underside of which is indicated at 14. The lower portion of the sidewall 12 transitions, as at a transition section indicated generally at 15, into the bottom assembly, indicated generally at 16.

The bottom assembly 16 is formed from metal 17 which is the base shell of the pan. Preferably the metal is aluminum or an aluminum alloy. The upper, that is, the inner surface 18 of shell 17, may or may not be coated with one of the conventional interior coatings such as Teflon ®. In this instance no interior coating has been shown for purposes of simplicity.

A plurality of grooves, here seven, of which three, 19, 20, 21, have been specifically numbered, are formed in the lower, exterior surface 22 of the bottom assembly. The grooves are circular, as best seen in FIG. 1, and have a smooth, sinuous contour, best seen in FIG. 3 but also in FIGS. 2 and 4.

The bottom assembly also includes a coating 23 which extends from the center of the vessel to at least the area where the transition section 15 blends into the bottom assembly 16. As best seen in FIG. 3, but also FIG. 2, the coating 23 is continuous in extent and uniform in thickness throughout the entire bottom area within the transition section 15. Preferably the coating 23 is enamel which may be either white or colored. For aesthetic reasons it may be desirable to provide a rather full bodied color, either, white, black or one of the spectrum, for a purpose which will appear hereinafter. Although a specially developed coating may be employed if desired, conventional enamels, to the extent they bond well to the coating next to be described, may be used. Said coating 23 is selected primarily on its ability to absorb heat quickly; that is, to transmit heat from a heat source to the cooking surface 18.

Means for providing frictional resistance to the sliding of the sinuous bottom in use while maximizing the rapid transfer of heat from the heat source to the interior cooking surface through the entire grooved area, that is, the peaks of grooves as well as the valleys, are illustrated in FIGS. 2, 3 and 4. The friction means comprises a circular friction pad 24 placed inside the grooves 19, 20, 21 on the central, un-grooved area 25, said pad having a substantial thickness and, preferably, covering the entire central area 25. It will be understood that because of the small diameter of the central area 25 as contracted to the outside edge of the bottom, a substantial force tending to displace the pan while in contact with a heat source will be resisted by the width of the friction pad acting in a direction opposed to the displacing force no matter in which direction the displacing force is applied to the pan. The composition of the resisting pad is a substance having high friction properties and the ability to bond to coating 23.

Supplemental friction means are indicated at 26, see FIGS. 3 and 4, which consists of a pad of high friction material lying outside the grooves 19, 20, 21, in the ungrooved area 27, said pad having an annular configuration. That will be noted that the friction material lies inside of and outside of the grooves; that is, it flanks the grooves, so that the peaks and valleys of the grooves contain no additional material, and thus, no impediment to the rapid transfer of heat from the heat source to the cooking surface 18 exists. By maintaining the grooved area 34 free of any material other than the coating 23, the primary object of rapid heat transfer through the pan bottom assembly is achieved. The supplemental friction material 27 may be the same material as pad 24.

The method of forming the bottom assembly is diagrammatically illustrated in FIG. 4.

The grooves 19, 20, 21 are formed in such a way that the stock which initially occupied the cross-sectional area of the grooves is physically removed. One way to remove the stock or mass is a lathe cutting process illustrated at 40 in FIG. 4. This has a positive effect on the heat transfer characteristics of the metal 17, as contrasted to, for example, coining, in that upward displacement of the metal on the food receiving surface 18 (which occurs in a coining operation) is precluded; such upward displacement results in a change in configuration but no change in mass of the original metal and hence, a greater mass of metal must be heated before the cooking surface reaches cooking temperature. Further, coining results in upward displacement of portions of the cooking surface of the vessel which increases cleaning difficulties as contrasted with the flat surface which characterizes this invention. There will also be a positive increase in the rate of heat conductivity through the thin sections 33 which lie opposite the bases of the grooves 18–20, see FIG. 3, as contrasted to the structure which results from coining.

After the grooves 19–21 are formed in the metal 17, a coating of heat-conductive enamel is applied as shown in the second segment of FIG. 4 before the friction material is applied to a specific portion only of the ungrooved bottom surface 22 by any conventional means, all as best seen in the third segment of FIG. 4. It will be understood that the friction material 26 may be applied in ring area 27 to cover the entire ring area, or in discrete segments, such as are illustrated at 28, 29 and 30, leaving the spaces 31, 32 between the segments covered only by the coating 23. The use of discrete segments may be more advantageous in that a greater number of edges are presented to the supporting surface.

Preferably the colors of coatings 23 on the one hand and 24 and 26 on the other hand are contrasting to present a pleasing aesthetic appearance to the eye.

The grooves 19-21 etc. are circular. As a consequence a plurality of grooves will always be perpendicular to a pan support structure, such as a gas burner, in all directions of movement of the vessel with respect to the burner. Further, a plurality of grooves will always be disposed at an angle less than perpendicular to a pan support structure in all directions of movement, the angularity between the support structure and the grooves, and the high coefficient of friction between the coating 26 and the pan support structure, creating a resisting force acting against movement of the vessel across the support structure. The result will be that the coefficient of friction between the vessel bottom and a support structure will always be greater than the coefficient of friction between a flat vessel bottom and the support structure so that the tendency of the vessel to be displaced from the heat source supporting structure, and the contents to be spilled, is substantially reduced.

The concentric grooves form a series of paths for the flame or, more accurately, the hot products of combustion, which results in a uniform distribution of heat over the entire bottom assembly 16. At the same time, since the area of each groove is larger than the area which would be present if the vessel shell were of uniform thickness, a correspondingly greater surface area is exposed to the heat source which increases the speed of cooking and the efficiency of utilization of the caloric value of the heat source. Since the grooves are formed by the physical removal of portions of the metal 17, no disruption of the interior surface 18 will be present so that smooth, fast cooking and an easy cleaning surface is provided. At the same time, the presence of the concentric grooves will impart a rigidity to the bottom assembly which is greater than the rigidity present in the typical pan bottom of uniform thickness.

And most importantly, the presence of only a single heat absorbing coating on the major area of the bottom between ring area 27 and central section 25 will maximize the speed at which heat from the heat source travels through the pan and heats the Cooking surface 18 to the desired cooking temperature, the absence of any other material in the large annular space between ring 27 and the central section 25 eliminating any impediment to quick heat transfer from the heat source to the cooking surface 18.

FIG. 5 is a schematic illustration of the steps for manufacturing the cooking vessel illustrated in FIGS. 1 through 4. The shell 10 is pressed from a blank of aluminum or other suitable metallic material at 41. The plurality of grooves, i.e. 19, 20, 21 are cut into the bottom 16 of the pan 10 at 40 (see also FIG. 4). The pan 10 is washed in an acid or caustic solution at 42 to roughen up the exterior surface of the metallic material to improve the adherence of exterior coatings such as the enamel coating 23 (see FIGS. 2 and 3). The coating 23 is applied at 43 with a spraying operation. The pan 10 is subjected to an infrared curing process at 44 to achieve partial hardening of the porcelain. Complete hardening is achieved in the forced air cooling process at 45. The supplemental friction materials indicated at 26 and 24 (see FIGS. 2 and 3) are applied via a silk screening process at 46. If a decorative finish is desired, the additional decorative material may be silk screened onto the sidewall 12 at 47. The coating applied to the exterior of the pan 10 is transported through a gas fired oven at 48 to cure the enamel or porcelain 23 and supplemental frictional material 24, 26. After Curing at 48, the non-stick coating is applied to the interior with a spray process at 49. Again, the vessel 10 is transported through a gas fired oven to cure the interior coating at 50. The flange 13 is trimmed with a lathe process at 51, the stud is attached at 52, the handle is attached at 53 and the Vessel 10 is labeled and packed at 54.

An alternative embodiment is indicated generally at 10a in FIG. 6. Specifically, the vessel 10a includes no coating 23 or supplemental frictional material 24 or 26. The exterior surface 22a is a polished metal surface while the interior surface may or may not be coated with one of the conventional interior coatings such as Teflon ®. The configuration of the grooves is analogous to those illustrated with respect to FIGS. 1 through 4. The vessel 10a has essentially the same heat transfer characteristics as the vessel 10 illustrated in FIG. 1 and, in effect, may actually transmit heat through the bottom assembly 16a faster than the bottom assembly 16 of the vessel 10 due to the lack of any additional coatings applied thereto.

Turning to FIG. 7, the process for manufacturing the vessel 10a is simplified. The vessel is formed at step 41 and the grooves are cut at step 40 as shown in FIG. 5. After the acid washing at 42 the non-stick coating is applied to the interior surface 18 at 49, thereby deleting steps 43 through 48 as shown in FIG. 5. After the non-stick interior coating is cured in a gas fired oven at 50 and the flange 13 is trimmed at 51, the exterior surface 22a is buffed at 55 to provide an aesthetically appealing polished appearance. The attachment of the handle and packing at steps 52 through 54 are essentially the same as those discussed with respect to FIG. 5.

Turning to FIG. 8 and 9, a vessel 10b is provided with no enamel or porcelain coating 23 but with the supplemental frictional material is provided at 24, 26. Thus, a buffed metallic pan is provided with frictional material applied to the bottom assembly 16b. The process for manufacturing the vessel 10b is illustrated in FIG. 9. All of the steps have been previously discussed with respect to FIGS. 5 and 7.

From the foregoing exemplary description it will at once be apparent to those skilled in the art that various modifications may be made within the spirit and scope of the invention. Accordingly it is intended that the scope of the invention be limited solely by the hereafter appended claims when interpreted in light of the relevant prior art, and not by the foregoing description.

I claim:

1. A cookware vessel having rapid heat transfer through the major portion of its bottom, said cookware vessel including in combination
   sidewall means,
   a bottom assembly, and
   a transition section joining the sidewall means to the bottom assembly,
   said bottom assembly including a metal pan bottom,
   said pan bottom having a flat circular central area and
      a flat peripheral annular area located just inwardly from the junction of the transition section to the bottom assembly, said metal pan bottom further having a plurality of circular grooves between the central area and the peripheral area, said circular grooves being smooth and, in cross-section, section, substantially sinuous so as to eliminate sharp corners, said bottom assembly further including a heat transfer coating, said heat transfer coating being a coating of enamel extending continuously from the central area to the transition section, said bottom assembly further having friction areas, said friction areas being located on a peripheral area lying just inside the transition section, and a central area, said friction areas being comprised of a coating of material having a high coefficient of friction so as to inhibit sliding action of the vessel over a support surface such as a burner, the area between the peripheral area and the central area being covered by the heat transfer coating only so as to provide no impediment to the rapid transfer of heat from a heat source through the pan bottom and to the interior cooking surface.

2. The cookware vessel of claim 1 further characterized in that the grooves and the single heat transfer coating thereon occupying the entire area between the central circular flat area and the peripheral annular flat area.

3. The cookware vessel of claim 2 further characterized in that the interior of the pan is flat.

4. In a method of manufacturing a cookware vessel the steps of forming a metal pan from a blank, forming a plurality of sinuous grooves in the bottom surface of the metal pan, applying a coating of enamel extending from the center to the outer periphery of the bottom surface of said pan, applying a high friction material to an annular area at the outside edge of the pan radially outside the grooves, applying a high friction material to the central area of the pan bottom radially inside the grooves, said high friction material being applied to flat areas on the bottom of the pan which flank the area containing the sinuous grooves, the area containing the sinuous grooves having the enamel coating only thereon.

5. The method of claim 4 further characterized in that the enamel coating is of a substantially uniform thickness throughout the entire bottom area of the pan.

6. The method of claim 5 further characterized in that the high friction material is applied discontinuously to the annular area at the outside edge of the pan.

7. A cookware vessel having rapid heat transfer through the major portion of its bottom, said cookware vessel including in combination sidewall means, a bottom assembly, and a transition section joining the sidewall means to the bottom assembly, said bottom assembly including a metal pan bottom, said pan bottom having a flat circular central area and a flat peripheral annular area located just inwardly from the junction of the transition section to the bottom assembly, said metal pan bottom further having a plurality of circular grooves between the central area and the peripheral area, said circular grooves being smooth and, in cross-section, substantially sinuous so as to eliminate sharp corners, said bottom assembly further having at least one friction area, said friction area being located on a peripheral area lying just inside the transition section, said friction area being comprised of a coating of material having a high coefficient of friction so as to inhibit sliding action of the vessel over a support surface such as a burner.

8. A cookware vessel having rapid heat transfer through the major portion of its bottom, said cookware vessel including in combination sidewall means, a bottom assembly, and a transition section joining the sidewall means to the bottom assembly, said bottom assembly including a metal pan bottom, said pan bottom having a flat circular central area and a flat peripheral annular area located just inwardly from the junction of the transition section to the bottom assembly, said metal pan bottom further having a plurality of circular grooves between the central area and the peripheral area, said circular grooves being smooth and, in cross-section, substantially sinuous so as to eliminate sharp corners, said bottom assembly further having friction areas, said friction areas being located on a peripheral area lying just inside the transition section, and a central area, said friction areas being comprised of a coating of material having a high coefficient of friction so as to inhibit sliding action of the vessel over a support surface such as a burner.

9. A cookware vessel having rapid heat transfer through the major portion of its bottom, said cookware vessel including in combination sidewall means, a bottom assembly, and a transition section joining the sidewall means to the bottom assembly, said bottom assembly including a metal pan bottom, said pan bottom having a flat circular central area and a flat peripheral annular area located just inwardly from the junction of the transition section to the bottom assembly, said metal pan bottom further having a plurality of circular grooves between the central area and the peripheral area, said circular grooves being smooth and, in cross-section, substantially sinuous so as to eliminate sharp corners, said bottom assembly further having at least one friction area, said friction area being located on a central area, said friction area being comprised of a coating of material having a high coefficient of friction so as to inhibit sliding action of the vessel over a support surface such as a burner.

* * * * *